United States Patent
Hebbrecht et al.

(10) Patent No.: US 9,062,194 B2
(45) Date of Patent: Jun. 23, 2015

(54) METHODS AND COMPOSITIONS FOR TEXTILE LAYERS AND COATINGS

(71) Applicants: WETENSCHAPPELIJK EN TECHNISCH CENTRUM VAN DE BELGISCHE TEXTIELNIJVERHEID, Brussels (BE); UNIVERSITEIT GENT, Ghent (BE)

(72) Inventors: Geert Hebbrecht, Ghent (BE); Peter Dubruel, Eine (BE); Myriam Vanneste, Bellem (BE); Jan Laperre, Marke (BE); Etienne Schacht, Staden (BE); Jorg Schelfhout, Liedekerke (BE)

(73) Assignees: WETENSCHAPPELIJK EN TECHNISCH CENTRUM VAN DE BELGISCHE TEXTIELNIJVERHEID, Brussels (BE); UNIVERSITEIT GENT, Ghent (BE)

( * ) Notice: Subject to any disclaimer, the term of this patent is extended or adjusted under 35 U.S.C. 154(b) by 155 days.

(21) Appl. No.: 13/668,978

(22) Filed: Nov. 5, 2012

(65) Prior Publication Data
US 2013/0109773 A1 May 2, 2013

Related U.S. Application Data

(63) Continuation of application No. PCT/EP2011/002232, filed on May 5, 2011.

(30) Foreign Application Priority Data

May 6, 2010 (GB) .................................. 1007556.2

(51) Int. Cl.
| | |
|---|---|
| *A61K 9/14* | (2006.01) |
| *C08L 33/08* | (2006.01) |
| *C08J 3/075* | (2006.01) |
| *C08J 3/24* | (2006.01) |
| *C08J 9/00* | (2006.01) |
| *D01F 6/00* | (2006.01) |
| *D06M 15/27* | (2006.01) |
| *D06M 23/04* | (2006.01) |
| *A61K 9/16* | (2006.01) |

(52) U.S. Cl.
CPC ................. *C08L 33/08* (2013.01); *C08J 3/075* (2013.01); *C08J 3/243* (2013.01); *C08J 3/246* (2013.01); *C08J 9/0061* (2013.01); *C08J 2201/024* (2013.01); *C08J 2205/022* (2013.01); *C08J 2333/06* (2013.01); *C08J 2433/00* (2013.01); *C08J 2471/00* (2013.01); *D01F 6/00* (2013.01); *D06M 15/27* (2013.01); *D06M 23/04* (2013.01)

(58) Field of Classification Search
CPC ............................ C08J 9/0061; C08J 2423/00
USPC .............. 424/484, 486, 489; 514/56; 521/134
See application file for complete search history.

(56) References Cited

U.S. PATENT DOCUMENTS

| | | | |
|---|---|---|---|
| 4,220,152 A | 9/1980 | Dresback | |
| 4,725,628 A | 2/1988 | Garvey | |
| 4,725,629 A | 2/1988 | Garvey | |
| 5,955,188 A | 9/1999 | Pushaw | |
| 8,367,639 B2 * | 2/2013 | Kilck et al. | ...................... 514/56 |
| 2001/0044482 A1 | 11/2001 | Hu | |
| 2003/0010486 A1 | 1/2003 | Serra | |
| 2004/0234517 A1 * | 11/2004 | Bowman et al. | ........... 424/94.63 |
| 2007/0162121 A1 | 7/2007 | Tarrant | |
| 2007/0248675 A1 * | 10/2007 | Tae et al. | ....................... 424/486 |
| 2008/0057809 A1 | 3/2008 | Rock | |
| 2008/0314831 A1 | 12/2008 | Childs | |
| 2011/0033543 A1 * | 2/2011 | Kiick et al. | .................... 424/484 |

FOREIGN PATENT DOCUMENTS

| | | |
|---|---|---|
| EP | 0879830 | 11/1998 |
| EP | 1894482 | 3/2008 |
| EP | 2095831 | 9/2009 |
| JP | 04224816 | 8/1992 |
| WO | WO 9717129 | 5/1997 |
| WO | WO 03008078 | 1/2003 |

OTHER PUBLICATIONS

International Search Report and Written Opinion dated Nov. 10, 2011 issued for International PCT Application No. PCT/EP2011/002232.
Search Report dated Sep. 7, 2010 issued for GB Application No. GB1007556.2.

* cited by examiner

*Primary Examiner* — Terressa Boykin
(74) *Attorney, Agent, or Firm* — K&L Gates LLP

(57) ABSTRACT

A method for preparing a solid composite material comprising a structural polymer matrix and a thermo-responsive hydrogel involves forming a substantially homogeneous blend of a cross-linkable compound and monomer, oligomer or polymer particles in a blended aqueous liquid, inducing the cross-linkable compound to cross-link to form the thermo-responsive hydrogel and forming the structural polymer matrix from the structural polymer by a further induction means, wherein the resulting solid composite material provides a textile or membrane which presents a thermally insulating layer, through which air and/or liquid water cannot easily pass at low temperatures, but which also provides a more open structure at higher temperatures so that air and moisture vapor can pass through the textile or membrane.

20 Claims, No Drawings

METHODS AND COMPOSITIONS FOR TEXTILE LAYERS AND COATINGS

CROSS-REFERENCE TO A RELATED APPLICATION

This application is a continuation of International Application Number PCT/EP2011/002232 filed on 5 May 2011 which claims benefit of GB Patent Application No. 1007556.2 filed on 6 May 2010. The entire disclosure of each application is incorporated by reference herein.

TECHNICAL FIELD

The invention relates to solid composite compositions for use on fibres, yarns, fabrics, textiles or garments. The compositions may be applied as coatings or may be present as self-supporting layers. The compositions are adapted to provide a low permeability to water vapour at low temperatures and a high permeability to water vapour at high temperatures to provide fabrics and garments whose behaviour is responsive to the temperature and humidity of the neighbouring environment.

BACKGROUND

Conventional woven, knitted or non-woven textiles and fabrics have properties such as water vapour transmissibility, wicking behaviour and thermal insulation characteristics that are reliant upon the fabric construction and remain substantially invariant when changes occur in ambient conditions or in the physical activity of a wearer of a garment made from such textiles. In this specification, the term "textile" is used to mean a flexible material comprising a network of natural or artificial fibres, threads or yarns which has been formed by weaving, knitting, crocheting, or by entanglement (e.g. for non-woven or felted textiles). The term textile is meant to incorporate such terms as fabric, cloth, ticking or the like.

It is known in the prior art to use layers of materials such as porous, hydrophobic membranes (such as porous fluoropolymer membranes) in order to provide so-called breathable water-repellent layers, which are impermeable to liquid water but which may permit the passage of water vapour through the pore structure.

One problem with such hydrophobic membranes is that as the ambient temperature approaches body temperature or increases above body temperature (say 37° C.), the water vapour flow through the membrane may be inadequate for the comfort of a person wearing a garment containing the membrane, particularly when that person is active and generating sweat from their body.

The use of hydrogel particles disposed or dispersed throughout a binder or matrix, where the hydrogel particles are present as a discontinuous dispersed solid phase in a continuous solid matrix, is known in the prior art.

US 2008/0057809 A1 discloses a textile having a smooth surface with one or more regions having a bound coating of hydrogel exhibiting expansion or contraction in response to a change in relative humidity and/or exposure to sweat adjusting insulation performance, air movement and/or liquid management of the textile fabric in response to ambient conditions. The hydrogel is in the form of particles disposed in a binder, the particles having a particle size in the range from 1 to 5000μ. The hydrogel particles may themselves be in the form of an interpenetrating polymer network, for instance of poly(N-isopropylacrylamide) and hydrophilic polyurethane, with these particles held or disposed in a binder, and the binder holding the dispersed particles deposited on a surface of a textile. US 2008/0057809 A1 also discloses responsive yarns and/or fibres having a plurality of gel particles disposed in a binder such as polyurethane, silicone rubber or polyacrylic polymer.

US 2003/0010486 A1 discloses a web of material for a wet suit which has a layer of gel particles (1 to 5000 micrometers in size) embedded in a foam matrix.

The prior art materials may exhibit disadvantages related to low mechanical strength arising from the dispersed hydrogel particles, particularly for thin layers or fibres, and the binder or matrix may need to be hydrophilic, or need to be rendered hydrophilic, in order to allow moisture to pass into the hydrogel particles through the binder or matrix.

It is desirable to provide a textile or membrane which presents a thermally insulating layer, through which air and/or liquid water cannot easily pass at low temperatures, but which also provides a more open structure at higher temperatures so that air and moisture vapour can pass through the textile or membrane allowing a wearer to be cooled by evaporation of sweat from the skin, to improve comfort. It is also desirable that such a membrane or textile should permit water vapour to pass out through it even at low ambient temperatures, but that water vapour permeability should increase at higher temperatures, in order to prevent an active user from generating a layer of undesirable, un-evaporated sweat against the skin of the wearer. It is also desirable that such a coating or membrane should be effective if applied as a thin coating layer, and/or should be strong enough to be self supporting as a membrane. It is also desirable to provide a composite material in the form of a fibre or yarn suitable for use in the manufacture of textiles.

SUMMARY OF THE INVENTION

Hence, it is one object of the invention to provide a method for forming a solid composite material, suitable for use as a fibre or yarn and/or as a membrane and/or as a coating for fibres, yarns or textiles, which is capable of providing good permeability to air and/or water vapour at high ambient temperatures, and which provides low permeability to air and liquid water but high permeability to water vapour at low ambient temperatures. It is also an object of the invention to provide a method for preparing a solid composite material which has good mechanical strength and which is capable of demonstrating the desired permeability behaviours when present as a thin coating, fibre, yarn or membrane. It is also an object of the invention to provide solid composite materials with the above-mentioned properties, and textiles and/or garments for providing improved comfort for the user or wearer.

Hence, a first aspect of the invention provides a method for preparing a solid composite material comprising a structural polymer matrix and a thermo-responsive hydrogel, the method comprising:
i) providing the structural polymer as monomer, oligomer or polymer particles,
ii) providing a cross-linkable compound comprising reactive moieties which are mutually cross-linkable to form the thermo-responsive hydrogel,
iii) forming a substantially homogeneous blend of the cross-linkable compound and the monomer, oligomer or polymer particles of structural polymer in a blended aqueous liquid,
iv) inducing the cross-linkable compound to cross-link by a first induction means whereby the thermo-responsive hydrogel is formed, and
v) forming the structural polymer matrix from the structural polymer by a second induction means.

A second aspect of the invention provides a solid composite material obtained or obtainable by a method according to the first aspect of the invention.

A third aspect of the invention provides a solid composite material for use as a fibre, membrane or textile coating comprising, or consisting essentially of, a structural polymer and a cross-linked thermo-responsive hydrogel in solid interpenetrating matrices.

By the term "solid interpenetrating matrices" it is meant that the cross-linked hydrogel is not substantially present as individually dispersed particles through a continuous structural polymer matrix, but instead that the hydrogel and solid polymer form bicontinuous, solid, interpenetrating matrices.

A fourth aspect of the invention provides a fibre, yarn, or membrane consisting essentially of a solid composite material according to the second or third aspects of the invention.

A fifth aspect of the invention provides a fibre, yarn or textile comprising a coating of a solid composite material according to the second or third aspects of the invention.

A sixth aspect of the invention provides a garment comprising a solid composite material according to the second or third aspects of the invention.

DETAILED DESCRIPTION OF THE INVENTION

The first aspect of the invention provides a method for preparing a solid composite material. The resulting solid composite material comprises or consists essentially of a thermo-responsive hydrogel and a structural polymer. Without wishing to be bound by theory, it is thought that the method for preparing the solid composite material results in interlocking and/or bi-continuous solid matrices of the structural polymer and of the thermo-responsive hydrogel, which is thought to yield a strong material, with the strength provided by the structural polymer, and yet also a material which is capable of rapid moisture uptake and permeability, because of the continuous nature of the thermo-responsive hydrogel matrix.

In this specification, when a composition is said to "consist essentially" of defined components, it is meant that the composition contains any additional components, other than the defined components, at levels of less than 10% by weight, suitably less than 5% by weight, more suitably less than 1% by weight.

The method requires the provision of structural polymer as monomer, oligomer or polymer particles and the provision of a cross-linkable compound comprising reactive moieties which are mutually cross-linkable to form the thermo-responsive hydrogel.

The structural polymer and the cross-linkable compound are formed into a substantially homogeneous blend in a blended aqueous liquid. Typically the liquid may be a dispersion with the structural polymer dispersed therein as latex particles. By "aqueous liquid" is meant that the liquid used for the liquid comprises at least 50% by weight of water, though other liquid components may also be present. Where a liquid is mentioned in this specification, the liquid may be a solution or it may be in the form of an emulsion or dispersion.

The method includes the step of inducing the cross-linkable compound to cross-link by a first induction means whereby the thermo-responsive hydrogel is formed, and also the step of forming the structural polymer matrix from the structural polymer by a second induction means.

These two steps may take place in any order or may occur substantially concurrently. It may be that one step is incomplete at the time when the other step commences. The sequence of the steps in the claim is not to be considered as limiting.

Suitably, the thermo-responsive hydrogel has a water absorption capacity W at 100% relative humidity and exhibits a transition temperature $T_W$, wherein W at temperatures below $T_W$ is greater than W at temperatures above $T_W$. In other words, the thermo-responsive hydrogel exhibits a behaviour such that it has a greater water absorption capacity at low temperatures, below $T_W$, than it has at high temperatures, above $T_W$.

This critical temperature $T_W$ may also be referred to in the art as the Volume Phase Transition Critical Temperature (VPTCT) or Lower Critical Solution Temperature (LOST) of the thermo-responsive hydrogel. Typical thermo-responsive hydrogels suitable for use in the invention have a high water absorption W which remains substantially constant at temperatures below $T_W$, and which then falls monotonically over a temperature range of a few ° C. to a considerably lower value which then also remains substantially constant as temperature is further increased.

One such thermo-responsive gel known in the prior art is poly(N-isopropylacrylamide). This may, for instance, be cross-linked with N,N'-methylene-bis-acrylamide. This material has a $T_W$ of about 32° C. and exhibits approximately 90% volume loss due to change in water absorption capacity when heated from a temperature below $T_W$ to a temperature a few degrees above $T_W$.

Preferably, $T_W$ is from 0 to 50° C, more preferably from 20 to 45° C., even more preferably from 25 to 35° C.

Preferably, the reactive moieties of the cross-linkable compound are arranged to not substantially react with the structural polymer.

The solid composite material may be a solid foam composite material. In other words, it may comprise gas cells dispersed or distributed throughout the composite structure. The foam may be a closed-cell foam, where the cells are not substantially directly interconnected, but is preferably an open-cell foam, wherein the cells are substantially interconnected so that gas or vapour can flow from cell to cell. Typically, the gas cells will have diameters from 5 to 100 μm, preferably from 10 to 50 μm as measured by photomicrography of cross sections of the solid foam. The mean diameter of the cells may be from 10 to 50 μm.

The blended aqueous liquid may be a foamed blended aqueous liquid whereby the solid composite material, once formed, is a solid foam composite material.

The blended aqueous liquid may further comprise a foaming agent. This may assist with the formation of the foam. By "foaming agent" is meant surface active agent which may enhances foam formation through reduction of surface tension. The foaming agent may be present as up to 5% by weight of the blended aqueous liquid, preferably up to 3% by weight.

Suitable foaming agents include nonionic, anionic, cationic, amphoteric and zwitterionic surfactants. Suitable mixtures of surfactants may also be employed. For instance, suitable amphoteric foaming agents include alkyl betaines, alkyl sultaines and alkyl carboxylates. Suitable anionic foaming agents include alkyl ether sulfates, ethoxylated ether sulfates, phosphate esters, alkyl ether phosphates, ethoxylated alcohol phosphate esters, alkyl sulfates and alpha olefin sulfonates. Cationic foaming agents may also be used, such as alkyl quaternary ammonium salts, alkyl benzyl quaternary ammonium salts and alkyl amido amine quaternary ammonium salts. Alkyl amine oxides are also suitable foaming agents.

The cross-linkable compound may be provided in a first foamed liquid prior to forming the blended aqueous liquid. The structural polymer may be provided in a second foamed liquid prior to forming the blended aqueous liquid.

The first foamed liquid comprising the cross-linkable compound and the second foamed liquid comprising the structural polymer may be blended together to form the foamed blended aqueous liquid. For instance, the first and second foamed liquids may be gently folded together to avoid breaking the foams.

A blowing agent may be incorporated into the first and/or second liquids and/or into the blended aqueous liquid in order to assist in the generation of a foam. By the term "blowing agent" is meant a chemical blowing agent which generates gas to form the foam cells from solid particles.

Blowing agents include, for instance, azo-carbonate- and hydrazide-based compounds, including azodicarbonamide, azodiisobutyro-nitrile, benzenesulphonehydrazide, 4,4-oxybenzene sulfonylsemicarbazide and the like. Solid blowing agents typically decompose at a temperature of 140° C. or above. A typical blowing agent is, for instance, Expancel® 007 WUF 40 (AkzoNobel). This is incorporated into a liquid to be foamed in particulate form (as solid or liquid particles) and decomposes to generate bubbles to provide foam cells upon heating. The blowing agent may be present as up to 5% by weight of the blended aqueous liquid, preferably up to 3% by weight.

The gas or gases used for forming the cells of the foam may be incorporated directly into the first, and/or second and/or blended aqueous liquid(s) in gas or liquid form, and may include, for instance nitrogen, oxygen, carbon dioxide, low molecular weight hydrocarbons such as isobutane, argon, helium or the like.

The solid composite material of the present invention may further comprise conventional additives and/or stabilizers, such as anti-oxidants, stabilisers, acid scavengers, clarifying agents, colouring agents, anti-UV-agents, antistatic agents, slip/mould-release agents, flame retardants, etc. Typically, such additives may each be present at less than 5% by weight, more preferably less than 3% by weight relative to the total weight of the solid composite material.

The first induction means is preferably applied to induce formation the thermo-responsive hydrogel prior to the application of the second induction means to induce formation of the structural polymer matrix.

The structural polymer may be any suitable structural polymer capable of forming a self-supporting solid matrix. It is the structural polymer matrix which is thought to provide mechanical strength to the solid composite material of the invention. Typically, the structural polymer may be provided in the form of a latex dispersion (small particles of the structural polymer dispersed as an emulsion or sol) which may be induced to form a solid matrix by removal of the dispersing liquid, for instance by evaporation. This leads to the latex particles coming together and contacting each other, bonding together to form the solid polymer matrix. Such a process may be described as a sol-gel process. The structural polymer may for instance be a synthetic or natural rubber. For instance, the structural polymer may be selected from the group consisting of polyurethanes, polyolefins, polyacrylates, The structural polymer may be hydrophilic or hydrophobic, but is preferably a hydrophobic polymer, so that it does not absorb moisture.

Semi-crystalline polymers may be useful as the structural polymer, including melt-processable crystalline, semi-crystalline or crystallizable polymers or copolymers, including block, graft and random copolymers. Semi-crystalline polymers consist of a mixture of amorphous regions and crystalline regions. The crystalline regions are more ordered and segments of the chains pack in crystalline lattices. If crystalline regions are heated above the melting temperature of the polymer, the molecules become less ordered or more random. If cooled rapidly, this less ordered feature is "frozen" in place and the resulting polymer is said to be amorphous. If cooled slowly, these molecules can repack to form crystalline regions and the polymer is said to be semi-crystalline. Semi-crystalline polymers useful as the structural polymer in the present invention include, but are not limited to, high and low density polyethylene, linear low density polyethylene, polypropylene, polyoxymethylene, poly(methyl pentene), poly(ethylene terephthalate), poly(butylene-terephthalate), polybutene, and polystyrene.

Suitably, the structural polymer is selected from the group consisting of polyurethanes, polyolefins and polyacrylates. Mixtures of structural polymers may be employed, where these are mutually compatible.

Another method for forming the structural polymer matrix may comprise the polymerisation of oligomers or monomers of the structural polymer, induced by the second induction means, in order to form the structural polymer matrix. Combinations of these methods may also be used, for instance with monomer being present along with latex particles to give improved bonding between the latex particles to form the structural polymer matrix. Such a process is set out, for instance, in EP0879830.

The cross-linkable compound used to form the thermo-responsive hydrogel is preferably a terminally-modified nonionic triblock copolymer according to formula I:

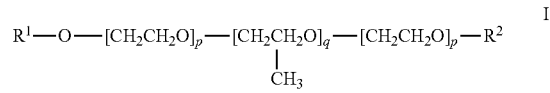

wherein $R^1$ and $R^2$ are reactive moieties which are mutually cross-linkable by the first induction means and wherein p is typically from 4 to 50, preferably from 5 to 20, more preferably from 6 to 12, for instance from 7 to 10 and q is from 5 to 150, preferably from 10 to 50 more preferably from 12 to 40 for instance from 15 to 20. The ratio p:q may suitably be from 1:1 to 1:4, preferably from 1:1.5 to 1:3. By selection of appropriate values for p and q, $T_W$ may be adjusted to a desired temperature for the thermo-responsive polymer. For instance, when p is about 9 and q is about 15, the value of $T_W$ will be about 35°.

Nonionic triblock copolymers according to Formula I, when $R^1$ and $R^2$ are H (i.e terminal OH groups are present, are known as poloxamers, commercially available from BASF under the trade name Pluronic®. In Formula I, the degree of polymerisation for oxyethylene (p) is indicated to be the same for each polyoxyethylene block of the copolymer, but for the sake of clarity it should be explained that these degrees of polymerisation are mean values and are approximately the same rather than identical for any particular formula.

For the Pluronic® materials, coding of these copolymers starts with a letter to define its physical form at room temperature (L=liquid, P=paste, F=flake (solid)) followed by two or three digits, The first digit (two digits in a three-digit number) in the numerical designation, multiplied by 300, indicates the approximate molecular weight of the polyoxypropylene block; and the last digit×10 gives the percentage polyoxyethylene content (e.g., L35=Pluronic with a polyoxypropylene molecular mass of 900 g/mol and a 50% poyoxyethylene content—i.e. equal weights of polyoxypropylene and polyoxyethylene in the molecule). The values of p and q can be simply derived algebraically from the numerical trade code by assuming that the molecular weight for each oxypropylene monomer is 59 and the molecular weight for each oxypropylene monomer in the formula is 44.

Hence, for Pluronic L35, q=900/59=15.25 and q=0.5×(900/44)=10.23.

For Pluronic L42, q=1200/59=20.34 and q=0.5×(20/80×1200/44)=6.8.

In this specification, the use of p and q is merely meant to simplify the convention of defining the poloxamers commercially by the polyoxypropylene molecular mass and the percentage by weight of polyoxyethylene in a poloxamer by algebraic conversion. The two definitions of the structure are intended to be equivalent, and define the poloxamer structure prior to incorporation into the structure of the reactive moieties $R^1$ and $R^2$ to yield the cross-linkable compound of Formula I.

$R^1$ and $R^2$ may be any suitable reactive moieties used in polymer chemistry for providing cross-linking capability. They may be the same or may be different reactive moieties. For instance, $R^1$ and $R^2$ are independently selected from reactive moieties selected to react by a condensation reaction. $R^1$ and $R^2$ may be independently selected from reactive moieties selected to react by an addition reaction. Suitable pairings of reactive moieties capable of reacting to provide covalent bonding may be used for $R^1$ and $R^2$.

For instance, $R^1$ and $R^2$ may be independently selected from acrylate, methacrylate, dialkylsiloxane, ethylene, substituted ethylene or the like, with the first induction means adapted to provide covalent bonding between $R^1$ and $R^2$.

Acrylate and methacrylate are particularly preferred reactive moieties. These may be formed, for instance, by reaction of the terminal OH groups of the triblock copolymer with acryloyl chloride or methacryloyl chloride, for instance, in the presence of a basic catalyst.

The first induction means may be irradiation with actinic radiation, such as ultra-violet radiation. In this case, the blended aqueous composition may further comprises a catalyst for inducing the cross-linkable compound to cross-link, for instance a so-called photoinitiator, for instance the Irgacure® photoinitiators available from the company Ciba.

The second induction means induces formation of the structural polymer matrix from the monomer, oligomer or polymer particles of the structural polymer. Where the structural polymer is present as latex particles, the second induction means may comprise drying the blended aqueous liquid to remove water whereby the structural polymer matrix is formed.

When a foam is required, the formation of the solid composite material may comprise drying and calandering. Initial drying may be carried out as the second induction means to a level that results in a material with sufficient physical strength to be manipulated but which contains sufficient water to allow further deformation by calandering. Drying may be typically carried at temperatures between 80 and 120° C. for about 2 minutes. The calandering is typically performed to crush the foam cells whereby the foam is provided with an open cell foam structure.

The second aspect of the invention provides a solid composite material obtained or obtainable by the method of the first aspect of the invention.

The third aspect of the invention provides a solid composite material for use as a fibre, membrane or textile coating comprising, or consisting essentially of, a structural polymer and a cross-linked thermo-responsive hydrogel in a solid interpenetrating matrix.

The structural polymer is preferably a hydrophobic polymer, so that it does not substantially absorb moisture.

The preferred features of the first aspect of the invention are applicable to the second and third aspects of the invention, and may be combined, for instance as set out in the claims.

The thermo-responsive hydrogel is suitably as set out for the first aspect of the invention.

The solid composite material may be a foamed solid composite material, and preferably has a substantially open cell foam structure. The structural polymer is suitably as set out hereinbefore, as is the cross-linked thermo-responsive hydrogel.

The fourth aspect of the invention provides fibre, yarn, or membrane consisting essentially of the solid composite material of the second or third aspects of the invention. The solid composite material of the invention may be fabricated into a fibre or membrane, for instance, by following the method of the first aspect of the invention to form the blended liquid, then inducing the cross-linkable compound to cross-link by the first induction means whereby the thermo-responsive hydrogel is formed. The resultant mixture can then be processed into a fibre using conventional means such as extrusion, whilst carrying out the step of inducing the structural polymer to form the structural polymer matrix by a second induction means. The resultant fibre may be spun into a yarn by industrial spinning methods. For a membrane, the resultant mixture may be processed using conventional sheet-forming techniques to provide a thin, self-supporting membrane. Where an open-cell foam structure is required for the membrane, this may be achieved by forming a closed cell foam layer and calendaring this, as set out hereinbefore, to burst the closed cells so that open pathways are formed between them to yield an open-cell structure.

The fifth aspect of the invention provides a fibre, yarn or textile comprising a coating of a solid composite material according to the second or third aspects of the invention. The solid composite material may, for instance, be coated onto a fibre yarn or textile as the blended liquid of the method of the first aspect of the invention, with the steps (iv) and (v) of the method of the first aspect of the invention carried out on the blended liquid after it has been put in place as a coating layer.

The sixth aspect of the invention provides a garment comprising a solid composite material according to the second or third aspects of the invention. This garment may comprise a layer or membrane of the solid composite material, or may have the solid composite material coated onto a surface. The garment may be at least partially formed from fibres or yarns of the solid composite material or of fibres or yarns coated with the solid composite material.

In use, the solid composite material of the invention will swell at temperatures below $T_W$ when the relative humidity of the surroundings is high. This is because of the ability of the thermo-responsive hydrogel to absorb moisture at temperatures below its VPTCT. Hence, the solid composite material will be in a swollen form at temperatures below $T_W$. When the solid composite material has a foam structure, the cells of the foam will be substantially be closed or blocked. Although water vapour may pass through the solid composite material under these conditions, the material may be substantially impermeable to liquid water and to air. For instance, if the solid composite material is used as a membrane or coating layer on a textile in a garment worn close to the body, the body's heat should drive moisture from sweat in the form of vapour from the body side of the membrane to the external side of the membrane (provided that the external RH is sufficiently low). However, cold air and liquid water may not be able to substantially pass through the membrane from the outside to reach the body of the wearer. This may provide good comfort at low ambient temperatures.

At temperatures in excess of $T_W$, the membrane or textile coating may substantially lose the absorbed moisture because the thermo-responsive hydrogel component will no longer by absorptive to the same extent. This may lead to shrinkage of the membrane volume. When the membrane has foam structure, this should lead to the pores of the foam being in an open state so that air as well as vapour can pass through the membrane more readily. This may lead to improved cooling and higher moisture loss rates from the body of the wearer, so improving comfort for the wearer at temperatures above $T_W$.

In the case where the solid composite material is used to coat the fibres or yarns of a woven, knitted or non-woven textile used in a garment, the solid composite material may swell at low temperatures, below $T_W$, closing the voids between the fibres/yarns so that liquid water and cold external air are excluded, though water vapour from sweat may still be driven through to the outside. At temperatures above $T_W$, the coating may shrink, opening the void spaces between fibres/yarns in the textile and so allowing air and vapour to circulate more freely.

Whenever appropriate, the use of the term "comprises" or "comprising" may also be taken to include the meaning "consists essentially of" or "consisting essentially of".

The optional and/or preferred features set out may be used either individually or in combination with each other where appropriate and particularly in the combinations as set out in the accompanying claims. The optional and/or preferred features for each aspect of the invention set out above are also applicable to any other aspects of the invention, where appropriate.

EXAMPLE

A specific embodiment of the present invention will now be described, by way of example only Pluronic® L35, a poloxamer as provided by BASF was chemically modified by reaction with acryloyl chloride to form a compound according to Formula I above where both $R^1$ and $R^2$ are acrylate groups. For this compound, referring to Formula I, p is about 10 and q is about 15. The cross-linkable compound was prepared as a solution in water with 50% by weight of the compound, 2% by weight of Laviron® 118SK alkyl amine oxide ex Cognis Germany (as a foaming agent) and 0.01% by weight of a UV photoinitiator (a mix of Irgacure® 184 and 819 from CIBA). The mixture is the first liquid (a solution).

For the second liquid, an equal mass of 50% by weight of a commercial polyacrylate latex aqueous dispersion was used.

Both the first and second liquids were foamed and the first and second foamed liquids were folded together and applied to a transfer sheet as a thin film.

UV radiation was shone onto the film as first induction means so that the $R^1$ and $R^2$ acrylate moieties of the cross-linkable compound are crosslinked and form the thermo-responsive hydrogel network.

The resulting film was then placed in an oven at 100° C. for 2 minutes for initial drying to remove water and to act as second induction means and to form a matrix of structural polymer from the polyacrylate latex particles. Hence in this example, the second induction means comprises drying the latex.

The resulting solid foam composite was then crushed between the rollers of a rotary mill (calendered) to provide an open cell foam structure.

The material was then further dried at 120° C. for a further 4 minutes to complete solidification of the structural polymer matrix.

The water vapour permeability of the resulting membrane (about 100 micrometers in thickness) was measured as a function of ambient temperature by gravimetrically monitoring moisture loss across the membrane from a 100% RH sample jar held at 37° C.

A comparative example was prepared using the method set out above, but using the second liquid only (without addition of the first liquid)

The results obtained are shown in Table 1.

TABLE 1

| Temperature/° C. | 20 | 25 | 30 | 35 | 40 |
|---|---|---|---|---|---|
| Permeability (comparative foam) | 5454 | 5292 | 4531 | 4465 | 2665 |
| Permeability (foam composite according to invention) | 3694 | 3266 | 2397 | 2764 | 2597 |

The permeability units are expressed in $g/m^2/day$ for water transmission through the membrane.

It can be seen that below 35° C., the water vapour permeability decreases with increasing temperature for both the comparative foam and for the foam according to the invention, but above 30° C., the comparative foam continues to show monotonic reduction in permeability with increasing temperature whereas the foam according to the invention demonstrates a markedly increased permeability.

It will be appreciated that numerous modifications to the above described embodiment may be made without departing from the scope of the invention as defined in the appended claims. For example, different reactive moieties may be employed as terminal reactive moieties for the Pluronic® poloxamer in order to provide cross-linking, or different values of p or q may be used for the poloxamer in order to tailor the value of $T_W$.

It is thought that the high responsiveness of the permeability of the solid composite material of the invention to ambient temperature arises from the bi-continuous nature of the inter-linked matrices of the structural polymer and of the thermo-responsive hydrogel.

It has also been found that the incorporation of the thermo-responsive hydrogel into a structural polymer matrix using the method of the invention gives a solid composite material which is more physically stable to wetting/drying cycles than if the hydrogel particles were simply dispersed as the discontinuous phase in a continuous structural polymer matrix. It has been found that with the latter arrangement, the hydrogel particles may become separated from structural polymer matrix after a number of wetting/drying cycles.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A method for preparing a solid composite material comprising a structural polymer matrix and a hydrogel as interlocking and/or bi-continuous solid matrices, the method comprising:
   providing the structural polymer as monomer, oligomer or polymer particles;
   providing a cross-linkable compound comprising reactive moieties which are mutually cross-linkable to form the thermo-responsive hydrogel;
   forming a substantially homogeneous blend of the cross-linkable compound and the monomer, oligomer or polymer particles of structural polymer in a blended aqueous liquid; and,
   forming the solid composite material comprising the structural polymer matrix and the hydrogel as interlocking and/or bi-continuous solid matrices, forming the solid composite material further comprising
      inducing the cross-linkable compound to cross-link, forming the thermo-responsive hydrogel, the thermo-responsive hydrogel having a water absorption capacity W at 100% relative humidity and exhibits a transition temperature $T_W$, wherein W at temperatures below $T_W$ is greater than W at temperatures above $T_W$, and
      forming the structural polymer matrix from the structural polymer by induction.

2. The method of claim 1 wherein $T_W$ is from 0 to 50° C.

3. The method of claim 1 wherein the blended aqueous liquid is a foamed blended aqueous liquid, whereby the solid composite material is a solid foam composite material.

4. The method of claim 3:
   wherein the cross-linkable compound is provided in a first foamed liquid prior to forming the blended aqueous liquid,
   wherein the structural polymer is provided in a second foamed liquid prior to forming the blended aqueous liquid, and
   wherein the first foamed liquid comprising the cross-linkable compound and the second foamed liquid comprising the structural polymer are blended together to form the foamed blended aqueous liquid.

5. The method of claim 1 wherein the formation of the thermo-responsive hydrogel is induced prior to the induction of the formation of the structural polymer matrix.

6. The method of claim 1 wherein the structural polymer is selected from the group consisting of polyurethanes, polyolefins and polyacrylates.

7. The method of claim 1 wherein the cross-linkable compound is a nonionic triblock copolymer according to formula I:

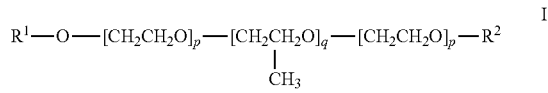

wherein $R^1$ and $R^2$ are reactive moieties which are mutually cross-linkable and wherein p is from 4 to 50 and q is from 5 to 150.

8. The method of claim 6 wherein $R^1$ and $R^2$ are independently selected from acrylate, methacrylate, dialkylsiloxane, ethylene or substituted ethylene.

9. The method of claim 1 wherein induction of the formation of the hydrogel further comprises irradiation with actinic radiation.

10. The method of claim 1 wherein the blended aqueous composition further comprises a catalyst for inducing the cross-linkable compound to cross-link.

11. The method of claim 1 wherein induction of the formation of the structural polymer matrix further comprises drying the blended aqueous liquid to remove water whereby the structural polymer matrix is formed.

12. A solid composite material for use as a fibre, membrane or textile coating comprising a structural polymer and a cross-linked hydrogel as solid interpenetrating matrices, wherein the hydrogel is a thermo-responsive hydrogel has a water absorption capacity W at 100% relative humidity and exhibits a transition temperature $T_W$, wherein W at temperatures below $T_W$ is greater than W at temperatures above $T_W$.

13. The solid composite material of claim 12 wherein the structural polymer is a hydrophobic polymer.

14. The solid composite material of claim 12 which is a foamed solid composite material.

15. The solid composite material of claim 12 wherein the solid composite material has a substantially open cell foam structure.

16. The solid composite material of claim 12 wherein the structural polymer is selected from the group consisting of polyurethane, polyolefin and polyacrylate, preferably polyolefin.

17. The solid composite material of claim 12 wherein the cross-linked thermo-responsive hydrogel comprises cross-linked nonionic triblock copolymer according to formula I:

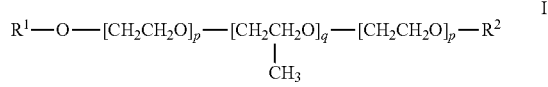

wherein $R^1$ and $R^2$ are reactive moieties which are mutually cross-linked in the cross-linked thermo-responsive hydrogel and wherein p is from 4 to 50 and q is from 5 to 150.

18. The solid composite material of claim 17 wherein $R^1$ and $R^2$ are independently selected from acrylate, methacrylate, dialkylsiloxane, ethylene or substituted ethylene.

19. A fibre, yarn, or membrane comprising a coating of the solid composite material of claim 12 or consisting essentially of the solid composite material of claim 12.

20. The solid composite material of claim 12 consisting essentially of the structural polymer and the cross-linked hydrogel.

* * * * *